United States Patent [19]

Seefried et al.

[11] Patent Number: 5,785,378
[45] Date of Patent: Jul. 28, 1998

[54] MOTOR VEHICLE SELF-SUPPORTING BODY SHELL STRUCTURE AND PROCESS FOR MANUFACTURE THEREOF

[75] Inventors: Johann Seefried, Eutingen; Roland Wendler, Boeblingen, both of Germany

[73] Assignee: Mercedes-Benz AG, Germany

[21] Appl. No.: 665,858

[22] Filed: Jun. 19, 1996

[30] Foreign Application Priority Data

Jun. 22, 1995 [DE] Germany .................. 195 22 680.1

[51] Int. Cl.$^6$ .......................................... B60J 7/00
[52] U.S. Cl. .......................................... 296/187; 296/203
[58] Field of Search .......................... 296/203, 202, 296/193, 187, 29, 30

[56] References Cited

U.S. PATENT DOCUMENTS

| 4,234,225 | 11/1980 | Harasaki et al. . | |
| 4,717,197 | 1/1988 | Harasaki | 296/187 |
| 4,973,103 | 11/1990 | Imajyo et al. | 296/195 |
| 5,042,872 | 8/1991 | Yoshii | 296/203 |
| 5,246,264 | 9/1993 | Yoshii . | |
| 5,443,297 | 8/1995 | Tanaka et al. | 296/203 |
| 5,480,208 | 1/1996 | Cobes et al. | 296/203 |

FOREIGN PATENT DOCUMENTS 27 12 084  9/1978  Germany .

*Primary Examiner*—Stephen Avila
*Attorney, Agent, or Firm*—Evenson, McKeown, Edwards & Lenahan, P.L.L.C.

[57] ABSTRACT

Self-supporting body shell structure for a passenger motor vehicle as well as a process for manufacturing it, has side panels with different reinforcing plates or partitions for reinforcing the side panel area. Each side panel is assembled of an interior side panel half joined together in one piece and a correspondingly profiled exterior side panel half. The reinforcements are a one-piece common integral component which is integrated between the two side panel halves.

4 Claims, 3 Drawing Sheets

MOTOR VEHICLE SELF-SUPPORTING BODY SHELL STRUCTURE AND PROCESS FOR MANUFACTURE THEREOF

BACKGROUND AND SUMMARY OF THE INVENTION

The present invention relates to a self-supporting body shell structure for a motor vehicle, having a chassis as well as side panels which laterally flank the chassis and which are provided with reinforcements, and to a process for manufacturing the body shell structure.

DE-OS 27 12 084 shows a self-supporting vehicle body structure with side panel subassemblies. Each subassembly has an outside panel which extends almost along the entire vehicle length and is joined to a one-piece inside panel which partially forms the closing plates for the A-, B- and C-pillar. For complete manufacture of the side panel subassembly, additional plate parts are nevertheless also required. Reinforcements within each side panel subassembly are not provided.

In newer vehicles, reinforcing plates or reinforcing partitions are used for reinforcing the vehicle structure in the side panel area at the relevant points. Depending on the requirements for the motor vehicle, a large number of reinforcing plates and reinforcing partitions is required.

It is an object of the present invention to provide a body shell structure as well as a process of the initially mentioned type with reinforcement of the side panels while keeping the manufacturing costs low.

For the self-supporting body shell structure, this object has been achieved in accordance with the present invention by providing that the reinforcements in each side panel are a common one-piece integral component which is inserted between an outer shell and an inner shell of each side panel. This integral component, which represents an integral reinforcement, according to the requirements and the manufacturability, can be manufactured from single-part or multi-part plate bars or may be joined together from piece parts. Particularly in the area of the forward door opening, each side panel has a plurality of reinforcements which, in a simple manner, are combined to form the one-piece integral component. Part of this integral component is also a closing plate for the door sill whose profile is formed by a sill area of the exterior side panel half.

The number of piece parts is thus considerably reduced by the present invention, whereby the expenditures for the logistics and the control will be decreased for the manufacturing of the body shell structure. As a result, joining areas between the individual reinforcements may also be eliminated so that a reduced number of welding points is obtained in the side panel area. Because the reinforcements are joined in the one-piece integral component and no longer require any joining flanges, a considerable weight reduction is achieved. Manufacturing tolerances are reduced by the above-described simple construction. This integral reinforcement is suitable for a conventional side panel construction as well as for the construction of the side panel from two side panel halves which were previously joined to form one piece.

A further advantageous aspect of the present invention is that each side panel is assembled of an interior side panel half joined together in one piece and of a correspondingly profiled exterior side panel half, between which the integral component is integrated. As a result, a particularly simple construction is obtained which ensures significantly reduced manufacturing and assembling expenditures.

In another embodiment of the present invention, the integral component is an integral reinforcement which surrounds a door opening of the side panel halves in a ring-like manner. As a result, particularly the area of the door opening is considerably reinforced whereby to achieve in particular an increased stability of the body shell structure.

For the process for manufacturing the body shell structure, the object of the present invention has been achieved in that the reinforcements are produced before the assembling of the interior and exterior side panel halves as a common integral component and subsequently the integral component is joined either to the interior or to the exterior side panel half. Consequently, a considerably simplified construction sequence of the body shell structure is achieved and results in a significant reduction of the manufacturing costs.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
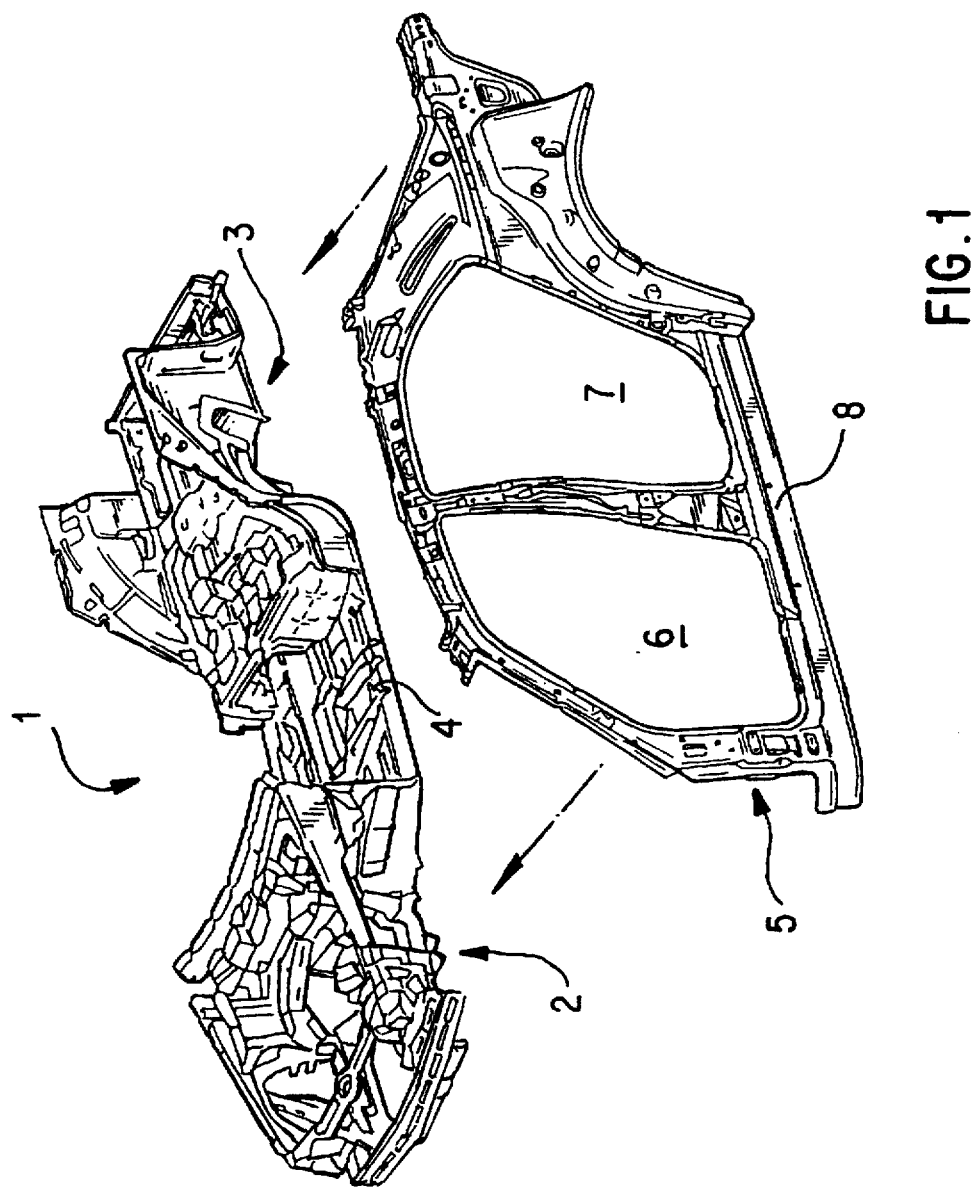
FIG. 1 is a perspective representation of a chassis as well as of an interior side panel half of an embodiment of the body shell structure according to the present invention.

Referring now to FIG. 1, a body shell structure for a passenger car has a chassis subassembly designated generally by numeral 1 which is provided with a floor 4. Toward the front in the longitudinal direction of the vehicle, the floor 4 is adjoined by a front wall 2, and the interior parts of the wheel houses 3 adjoin toward the rear. Adjoining the front wall 2 toward the front, interior parts of the upper side members are already arranged on the chassis subassembly 1. The upper side members are supplemented by the side member profiles 12 (FIGS. 2 and 3) which will be described below in greater detail.

From a side direction, a one-piece interior side panel half 5 is joined to the chassis subassembly 1 and forms a forward door opening 6 as well as a rearward door opening 7. The interior side panel half 5 has an interior profile part 8 for a door sill as well as the corresponding profile parts for an A-pillar, a B-pillar and a C-pillar. In addition, the interior side panel half 5 forms the interior profile part of the lateral roof frame. The interior side panel half 5 is joined to the chassis subassembly 1 by means of spot welding.

Figure 3:
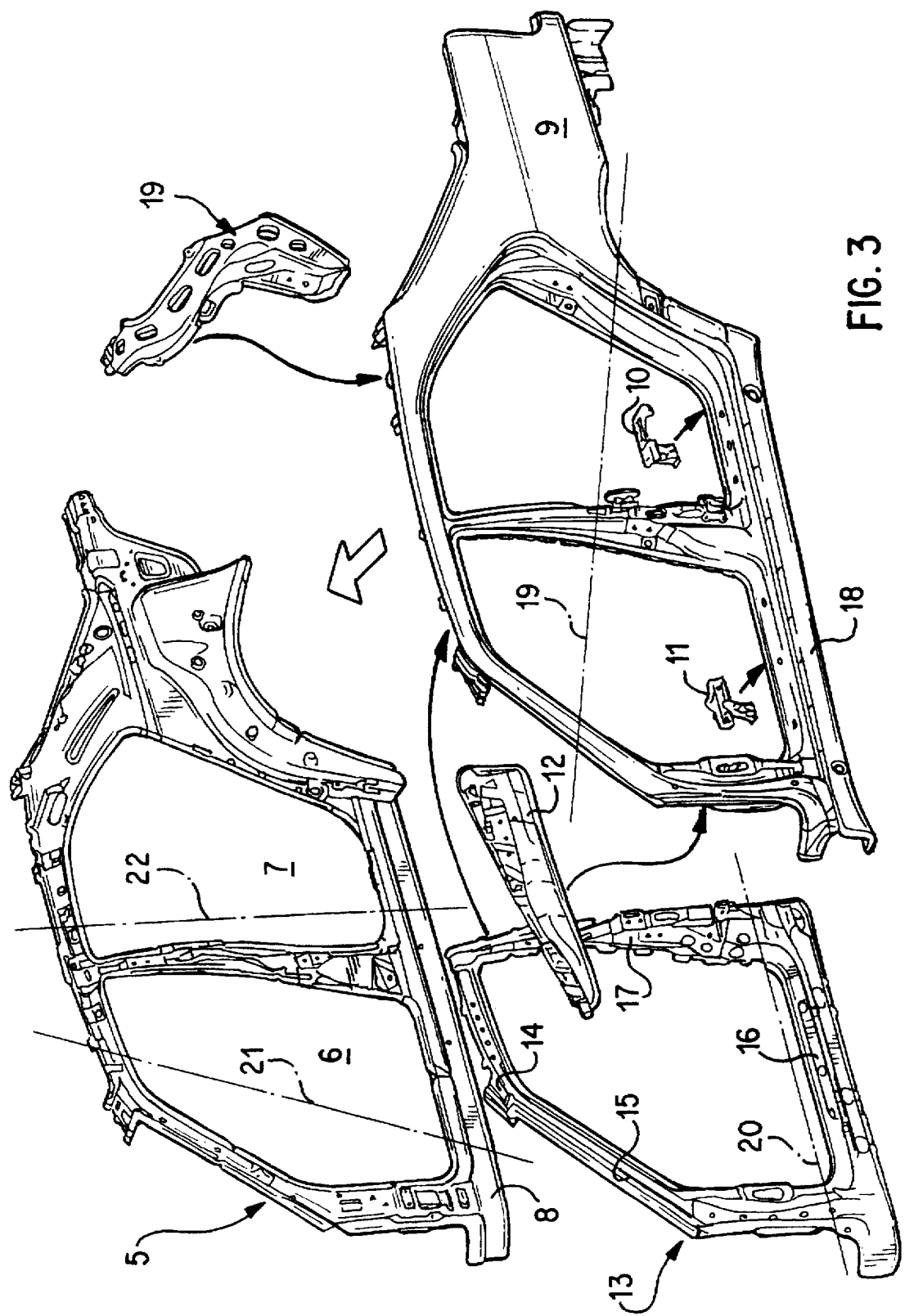
FIG. 3 is an exploded view of the different piece parts of the side panel subassembly of the body shell structure according to FIGS. 1 and 2.

In the area of the rear wheel houses 3, each interior side panel half 5 forms a wheel house end. Of course, it is to be understood that an interior side panel half 5 is adjoined to the chassis subassembly 1 on each side whereas FIG. 1 shows only the side panel half 5 which is on the left in the driving direction of the vehicle. The interior side panel half 5 is joined together in one piece from a three-part half-welded plate bar whose separating lines extend along the dash-dotted lines 21, 22 as best seen in FIG. 3.

Figure 2:
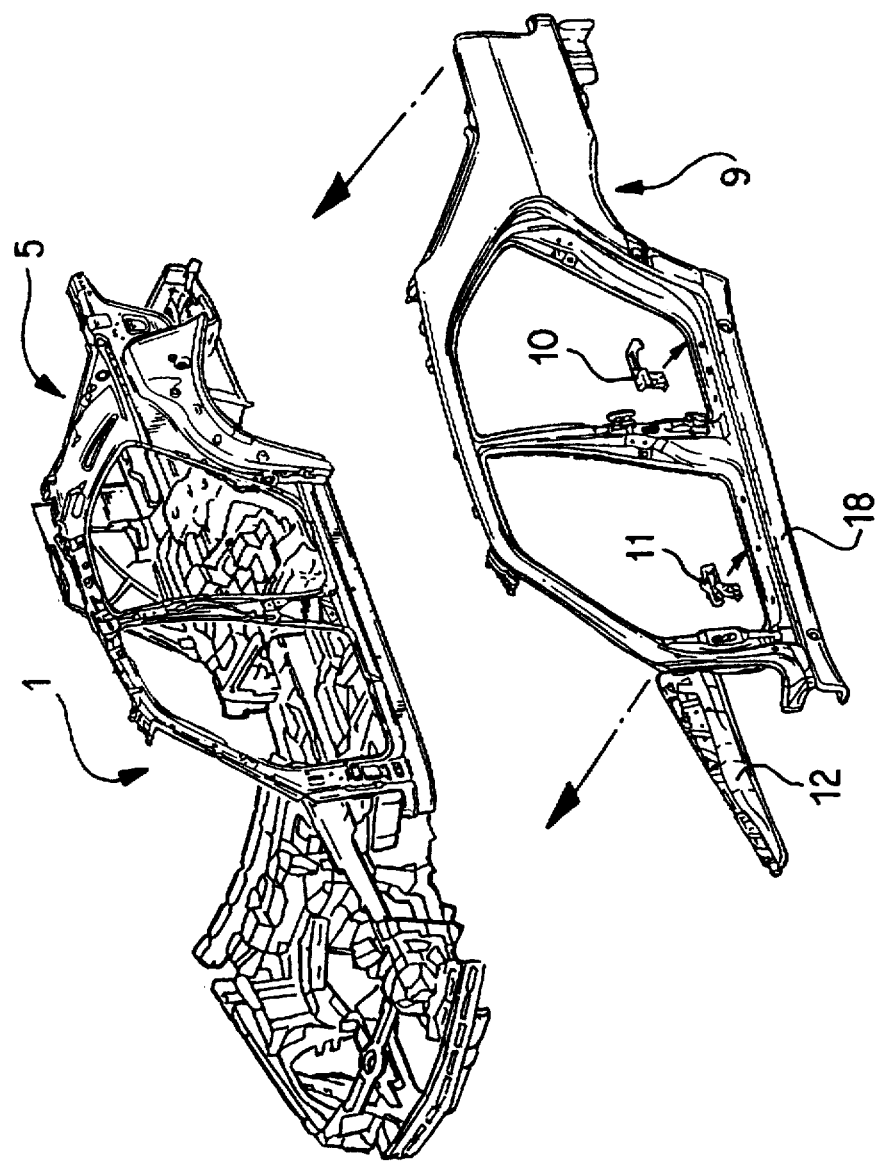
FIG. 2 is a construction sequence step for manufacturing the body shell structure according to FIG. 1 in which the exterior side panel half is joined to an interior side panel half which is already connected with the chassis, with an integral reinforcement for a forward door opening being joined to the exterior side panel half.

In another construction sequence step, an exterior side panel half 9 is joined in the direction of the arrow in FIG. 2 to each interior side panel half 5, in which, according to FIG. 3, an integral reinforcement 13, which will be described below in detail, as well as a side member profile 12 had previously been joined to the interior side panel half 9. The exterior side panel half 9 is manufactured as a one-piece component from a two-part plate bar, with the junction of the two plate bar parts extending along the dash-dotted line 19 diagonally through the side panel half 9.

The two exterior side panel halves 9 have the corresponding profile element halves with respect to the interior side panel halves 5 which are used as a covering of each interior side panel half 5 and cover it toward the outside. In particular, the exterior side panel half 9 has a sill area 18 which extends below the two door openings in the longitudinal direction of the vehicle and represents an open hollow profile which supplements the sill profile 8 of the interior side panel half 5.

The supplementary side member profile 12 is welded to the exterior side panel half 9 before the exterior side panel half 9 is joined to the interior side panel half 5. In addition, during the joining of the exterior side panel halves 9 to the interior side panel halves 5, a forward jack console 11 and a rearward jack console 10 are integrated between the two side panel halves 5, 9.

For reinforcing the pillar areas and sill areas at the level of the forward door opening 6, an integral reinforcement designated generally by numeral 13 is provided to surround the door opening 6 in a ring-like manner and is produced as a one-piece plate component which, in the illustrated embodiment, is configured as a plate bar divided into two parts with the junction of the plate bar extends along line 20 in FIG. 3. Before the exterior side panel half 9 is mounted to the interior side panel half 5, the integral reinforcement 13 is mounted to the interior side of the exterior side panel halves 9 so that the corresponding door opening areas are aligned with one another.

By virtue of the integral reinforcement 13, a reinforcement for the A-pillar area 15, for the roof frame area 14, for the B-column area 17 and for the sill area 16 is achieved so as to enclose the forward door opening 6. In addition, the side panel subassembly has a C-pillar reinforcement which, in the C-pillar area, is joined from the interior side, to the exterior side panel half 9. The exterior side panel half 9, which is reinforced in this manner, will now be joined in the direction of the broad arrow in FIG. 3 to the interior side panel half 5 and will be welded thereto. As a result, by way of relatively few piece parts, an extremely stable side panel subassembly can be produced in a simple manner. Because the individual parts of the side panel subassembly can be aligned excellently with respect to one another, the side panel subassembly can be joined to the chassis subassembly 1 almost without any tolerances.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A self-supporting body shell structure for a motor vehicle, comprising a chassis and two side panels which laterally flank the chassis and which are provided with reinforcements, each of the reinforcements constituting an integral component constructed in one piece in a prefabricated state and insertable in each side panel between an outer shell and an inner shell of each side panel, wherein the integral component is configured in the prefabricated state to surround a door opening of the side panel halves in a ring-like manner.

2. The structure according to claim 1, wherein each side panel comprises an interior side panel half joinable together in one piece, and a correspondingly profiled exterior side panel half between which the integral component is configured to be integrated.

3. A process for manufacturing a body shell structure for a motor vehicle, comprising a chassis and two side panels which laterally flank the chassis and which are provided with reinforcements constituting a one-piece integral component in each side panel insertable between an outer shell and an inner shell of each side panel, comprising the steps of prefabricating each of the reinforcements as the one-piece integral component configured to surround a respective door opening of the side panel halves in a ring-like manner, thereafter joining the integral component to one of an interior and an exterior side panel half, and finally joining the interior and exterior side panel halves.

4. The process according to claim 3, wherein, the step of joining the integral component to the interior or the exterior side panel half occurs after joining the interior side panel half to the chassis.

* * * * *